(12) United States Patent
Kim et al.

(10) Patent No.: US 11,121,745 B2
(45) Date of Patent: Sep. 14, 2021

(54) METHOD FOR TRANSMITTING PLURALITY OF BEAMFORMED REFERENCE SIGNALS FOR OPEN-LOOP MIMO TRANSMISSION IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Jiwon Kang, Seoul (KR); Hyunsoo Ko, Seoul (KR); Kijun Kim, Seoul (KR); Jonghyun Park, Seoul (KR); Haewook Park, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

(21) Appl. No.: 16/475,366

(22) PCT Filed: Jan. 2, 2018

(86) PCT No.: PCT/KR2018/000040
§ 371 (c)(1),
(2) Date: Jul. 1, 2019

(87) PCT Pub. No.: WO2018/124846
PCT Pub. Date: Jul. 5, 2018

(65) Prior Publication Data
US 2019/0341974 A1    Nov. 7, 2019

Related U.S. Application Data

(60) Provisional application No. 62/441,429, filed on Jan. 1, 2017.

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0486* (2013.01); *H04B 7/0626* (2013.01);
(Continued)

(58) Field of Classification Search
CPC .. H04B 7/0478; H04B 7/0632; H04B 7/0695; H04B 7/0486; H04B 7/0417;
(Continued)

(56) References Cited

U.S. PATENT DOCUMENTS

| 2014/0098689 A1* | 4/2014 | Lee | H04B 7/0639 370/252 |
| 2015/0043673 A1* | 2/2015 | Lee | H04B 7/0632 375/267 |
| 2016/0080059 A1* | 3/2016 | Yoon | H04B 7/0626 370/329 |

FOREIGN PATENT DOCUMENTS

| KR | 1020140004199 | 1/2014 |
| KR | 1020140080320 | 6/2014 |

(Continued)

OTHER PUBLICATIONS

PCT International Application No. PCT/KR2018/000040, Written Opinion of the International Searching Authority dated Apr. 24, 2018, 26 pages.

*Primary Examiner* — Ricardo H Castaneyra
(74) *Attorney, Agent, or Firm* — Lee, Hong, Degerman, Kang & Waimey

(57) ABSTRACT

Disclosed is a method for a terminal to report channel state information to a base station in a wireless communication system. The method comprises the steps of: receiving a first reference signal and a second reference signal which are cyclically beamformed in different directions in a predetermined resource unit from the base station; and reporting the channel state information to the base station on the basis of the first reference signal and the second reference signal,
(Continued)

wherein the channel state information comprises a first precoder group corresponding to the first reference signal and a second precoder group corresponding to the second reference signal.

8 Claims, 14 Drawing Sheets

(51) Int. Cl.
*H04B 7/06* (2006.01)
*H04L 5/00* (2006.01)
*H04W 72/08* (2009.01)

(52) U.S. Cl.
CPC ......... *H04B 7/0632* (2013.01); *H04L 5/0057* (2013.01); *H04W 72/085* (2013.01)

(58) Field of Classification Search
CPC ... H04B 7/0626; H04L 5/0057; H04L 5/0053; H04L 5/0051; H04W 72/085
See application file for complete search history.

(56) References Cited

FOREIGN PATENT DOCUMENTS

| | | |
|---|---|---|
| KR | 1020150017793 | 2/2015 |
| KR | 1020150123348 | 11/2015 |
| WO | 2016186378 | 11/2016 |

* cited by examiner (a) Control-plane protocol stack (b) User-plane protocol stack (A)     (B)

FIG. 12

|  | BF CSIRS 1 | BF CSIRS 2 |
|---|---|---|
| RI | Common RI | |
| PMI (option 1) | Cycling PMI set 1 | Cycling PMI set 2 |
| PMI (option 2) | Common cycling PMI set | |
| CQI | Common WB / SB CQI | |

METHOD FOR TRANSMITTING PLURALITY OF BEAMFORMED REFERENCE SIGNALS FOR OPEN-LOOP MIMO TRANSMISSION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/000040, filed on Jan. 2, 2018, which claims the benefit of U.S. Provisional Application No. 62/441,429, filed on Jan. 1, 2017, the contents of which are hereby incorporated by reference herein in its entirety.

TECHNICAL FIELD

The present disclosure relates to a wireless communication system, and more particularly to, a method for transmitting a plurality of beamformed reference signals for open-loop Multiple-Input and Multiple-Output (MIMO) transmission in a wireless communication system and apparatus therefor.

BACKGROUND ART

As an example of a mobile communication system to which the present disclosure is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the above discussion, the present disclosure provides a method for transmitting a plurality of beamformed reference signals for open-loop MIMO transmission in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of reporting channel state information to a base station by a User Equipment (UE) in a wireless communication system. The method may include: receiving, from the base station, a first reference signal and a second reference signal cyclically beamformed in a different direction on a predetermined resource unit basis; and reporting the channel state information to the base station based on the first and second reference signals. The channel state information may include a first precoder set corresponding to the first reference signal and a second precoder set corresponding to the second reference signal.

In another aspect of the present disclosure, provided is a User Equipment (UE) in a wireless communication system. The UE may include: a wireless communication module; and a processor connected to the wireless communication module. The processor may be configured to receive, from a base station, a first reference signal and a second reference signal cyclically beamformed in a different direction on a predetermined resource unit basis and report channel state information to the base station based on the first and second reference signals. The channel state information may include a first precoder set corresponding to the first reference signal and a second precoder set corresponding to the second reference signal.

Preferably, the channel state information may include a common rank indicator and a common channel quality indicator calculated on an assumption that the first and second precoder sets are applied.

More preferably, each of the first and second precoder sets may include one first precoder for supporting a dual codebook, and a first precoder corresponding to the first reference signal may be different from a first precoder corresponding to the second reference signal.

Further, the common rank indicator and the common channel quality indicator may be calculated on an assumption that in a resource unit in which the first reference signal is received, a first precoder corresponding to the first reference signal and a plurality of second precoders corresponding to the first reference signal and cycled in the resource unit are combined and applied and in a resource unit in which a twenty-first reference signal is received, a first precoder corresponding to the second reference signal and a plurality of second precoders corresponding to the second reference signal and cycled in the resource unit are combined and applied.

Additionally, the number of antenna ports for the first reference signal may be equal to the number of antenna ports for the second reference signal.

Advantageous Effects

According to the present disclosure, among a plurality of pieces of hybrid CSI for open-loop MIMO transmission, second CSI can be transmitted efficiently in a wireless communication system.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 12 shows open-loop CSI calculated and reported by a UE according to an embodiment of the present disclosure.

BEST MODE

Hereinafter, the structures, operations, and other features of the present disclosure will be understood readily from the embodiments of the present disclosure, examples of which are described with reference to the accompanying drawings. The embodiments which will be described below are examples in which the technical features of the present disclosure are applied to a 3GPP system.

Although the embodiments of the present disclosure will be described based on an LTE system and an LTE-Advanced (LTE-A) system, the LTE system and the LTE-A system are only exemplary and the embodiments of the present disclosure can be applied to all communication systems corresponding to the aforementioned definition. In addition, although the embodiments of the present disclosure will herein be described based on Frequency Division Duplex (FDD) mode, the FDD mode is only exemplary and the embodiments of the present disclosure can easily be modified and applied to Half-FDD (H-FDD) mode or Time Division Duplex (TDD) mode.

Figure 1:
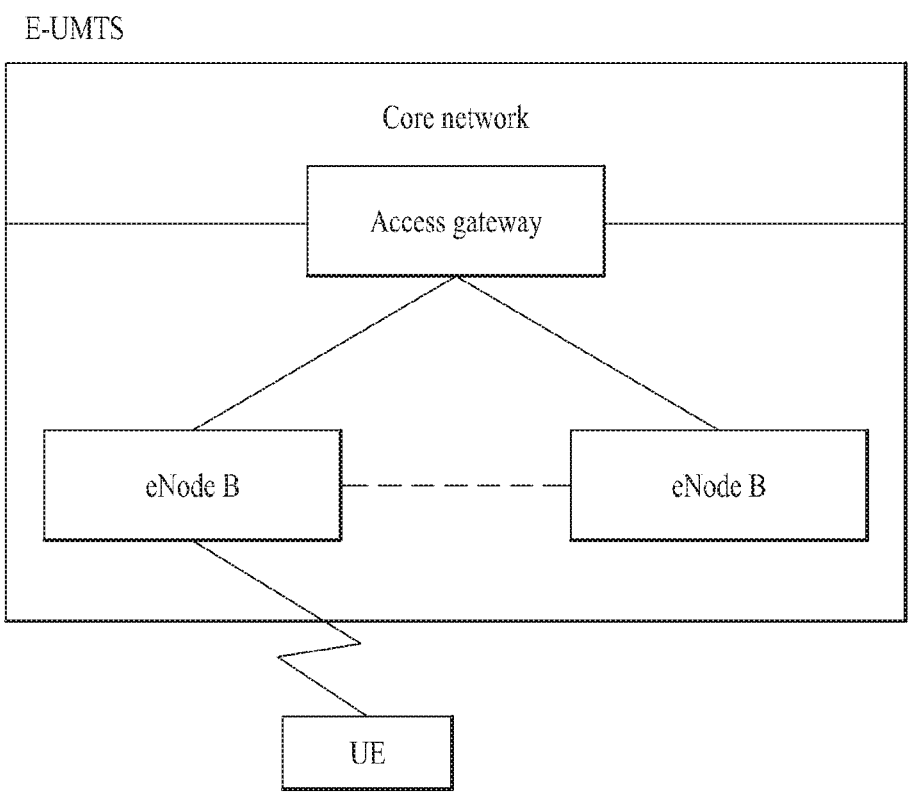
FIG. 1 is a diagram schematically illustrating a network structure of an E-UMTS as an exemplary radio communication system.
Figure 2:
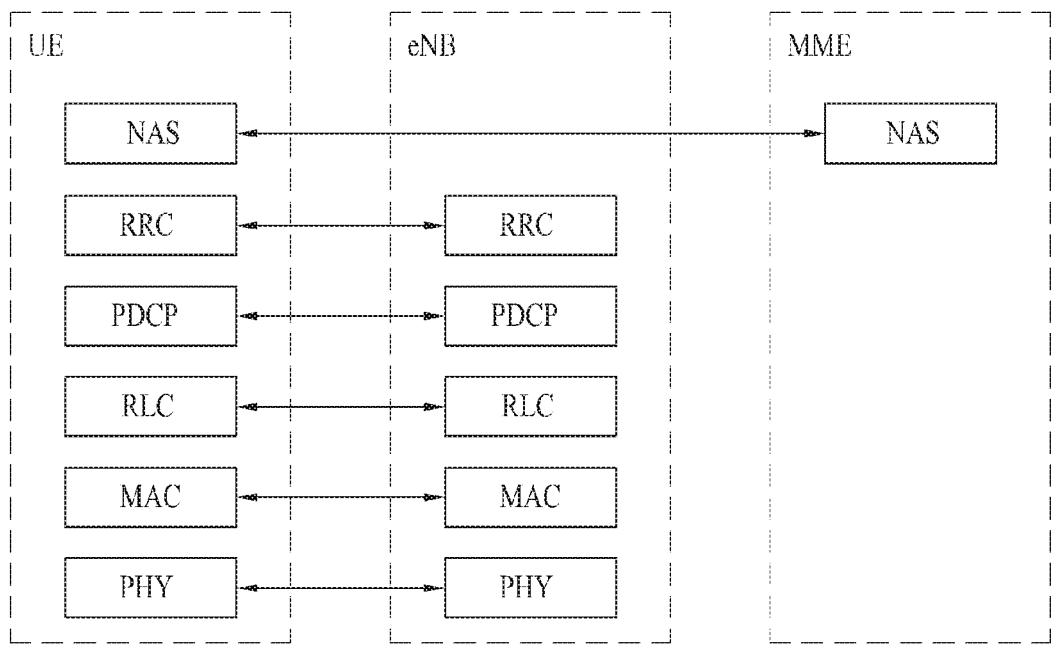
FIG. 2 is a diagram illustrating structures of a control plane and a user plane of a radio interface protocol between a UE and an E-UTRAN based on the 3GPP radio access network specification.
Figure 2:
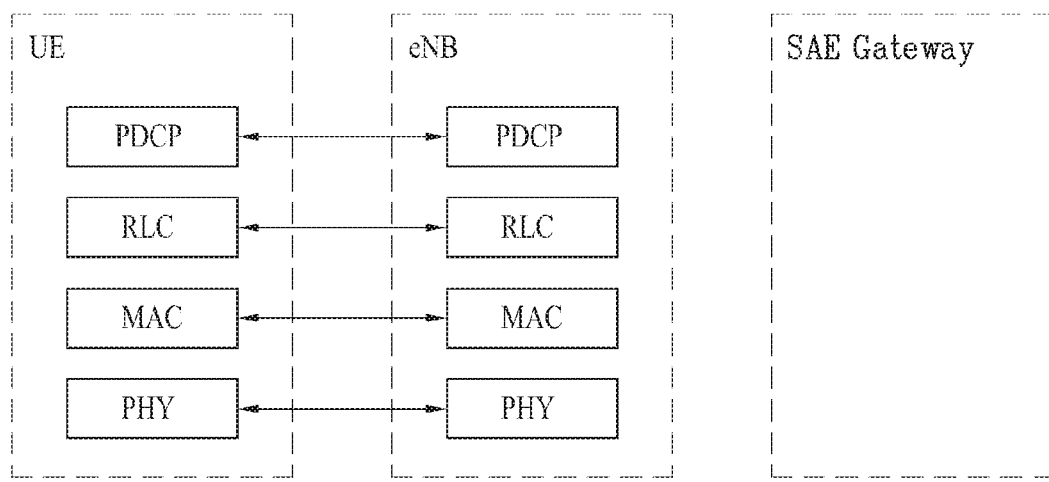

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC.

A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
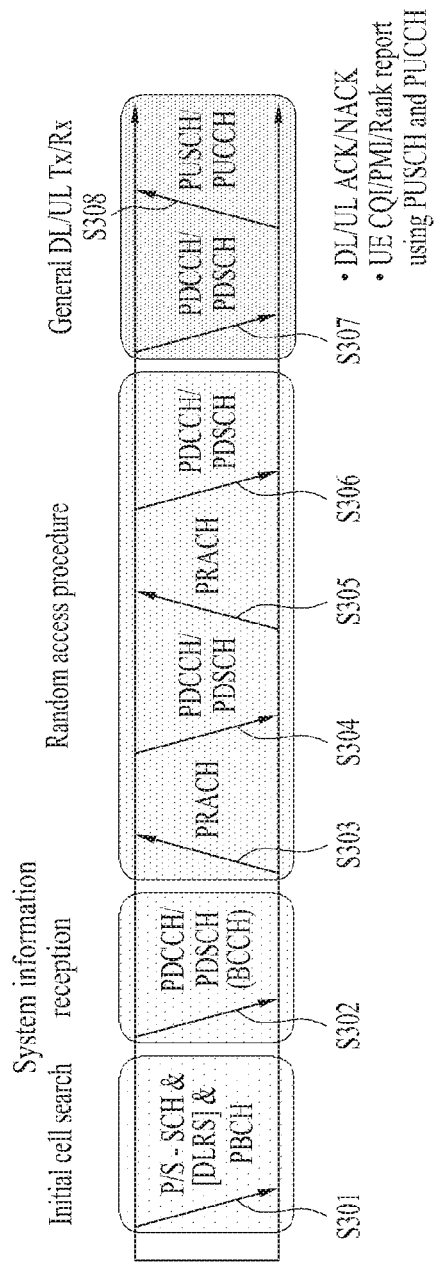
FIG. 3 is a diagram illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
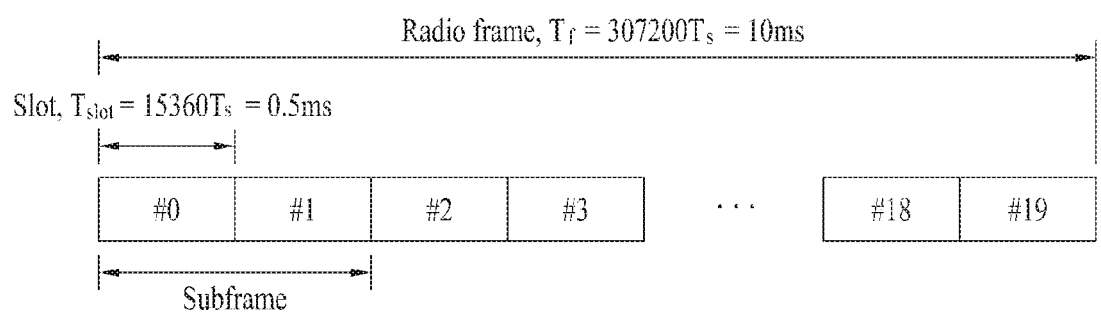
FIG. 4 is a diagram illustrating the structure of a radio frame used in an LTE system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by Ts=1/(15 kHz×2048)=3.2552×10−8 (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
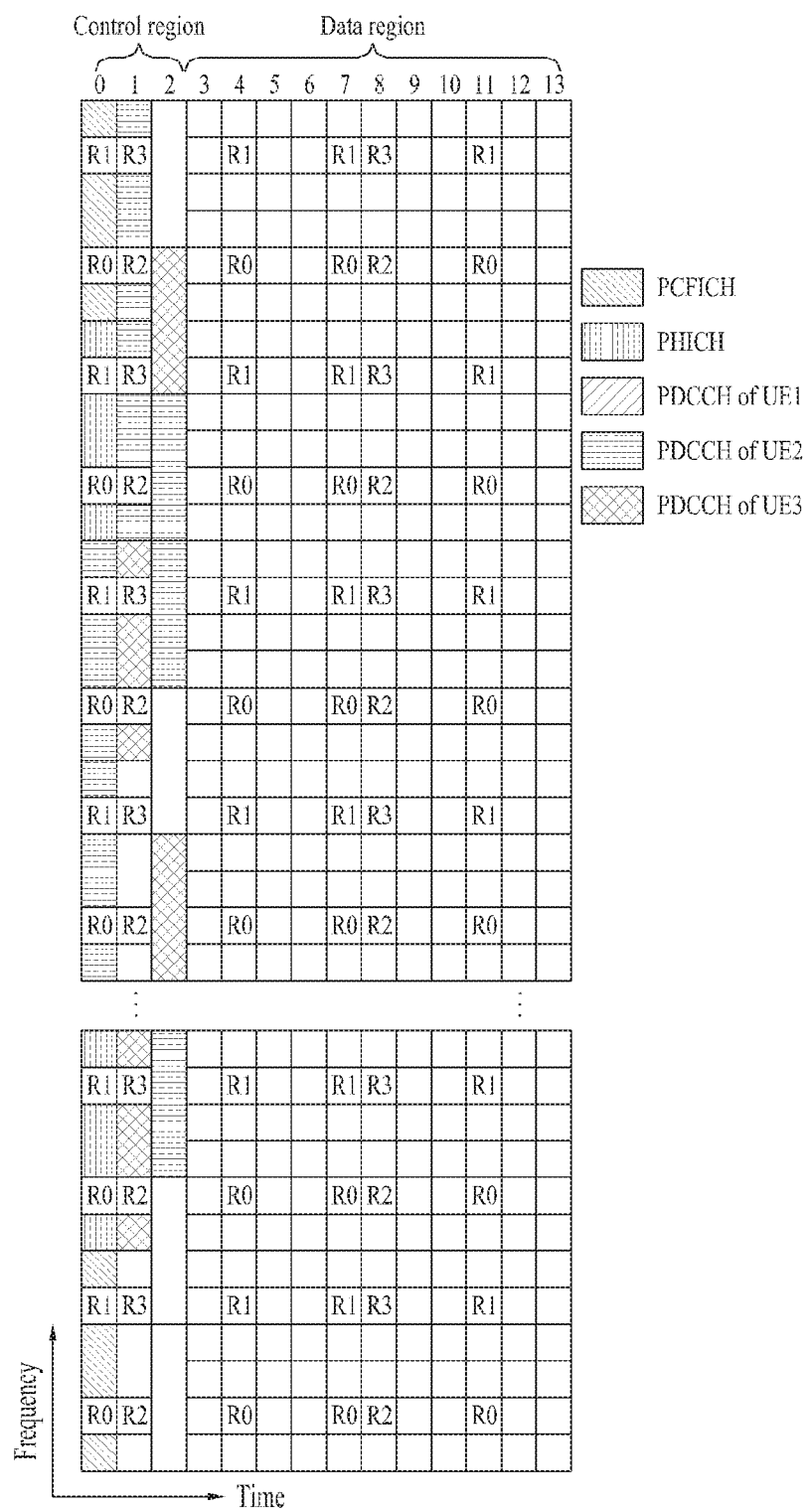
FIG. 5 is a diagram illustrating the structure of a DL radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
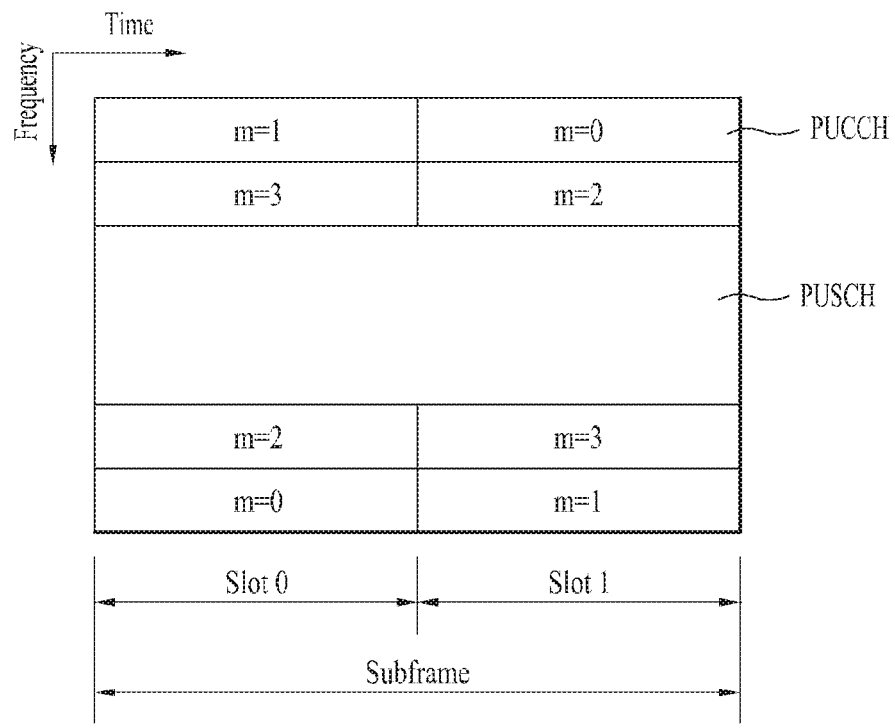
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
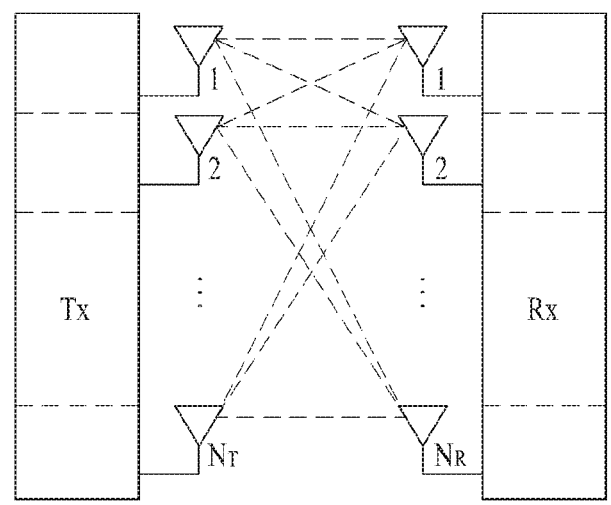
FIG. 7 is a diagram illustrating a configuration of a general MIMO communication system.

The configuration of a general MIMO communication system is shown in FIG. 7.

A transmitting end is equipped with NT transmission (Tx) antennas and a receiving end is equipped with NR reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is Ro, a transfer rate using multiple antennas can be theoretically increased by the product of the maximum transfer rate Ro by a rate increment Ri. The rate increment Ri is represented by the following equation 1 where Ri is the smaller of NT and NR.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that NT Tx antennas and NR Rx antennas are present. In the case of a transmission signal, a maximum number of transmittable pieces of information is NT under the condition that NT Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

NT transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \qquad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \qquad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \qquad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel Status Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1\,W2) \qquad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \text{ where } X_i \text{ is } Nt/2 \text{ by } M \text{ matrix.} \qquad \text{[Equation 9]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} \text{(if rank} = r\text{),}$$

where $1 \leq k, l, m \leq M$ and $k, l, m$ are integer.

Here, NT indicates the number of Tx antennas. M is the number of columns of the matrix Xi and indicates that total M candidate column vectors exist in the matrix Xi. Moreover, ekM, elM and emM indicate kth, lth and mth column vectors of Xi, respectively as column vectors, in which kth, lth and mth elements correspond to 1 and the rest of elements correspond to 0 among M elements. αj, βj, and γj are complex values having unit norms and indicate that, when kth, lth and mth column vectors of the matrix Xi are selected, phase rotations are applied to the selected column vectors, respectively. Here, i is an integer equal to or greater than 0 and indicates a PMI index indicating W1. And, j is an integer equal to or greater than 0 and indicates a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

In the LTE system, as described above, Chanel State Information (CSI) includes CQI, PMI, RI and the like, by which the CSI is non-limited. According to a transmission mode of each UE, CQI, PMI and RI may be transmitted all or in part. A case of transmitting CSI periodically is called a periodic reporting. A case of transmitting CSI in response to a request made by a base station is called an aperiodic reporting.

In case of the aperiodic reporting, a request bit included in UL scheduling information downloaded by a base station is transmitted to a UE. Thereafter, the UE delivers CSI considering a transmission mode of the UE to the base station through a UL data channel (PUSCH).

In case of the periodic reporting, a period, an offset in the corresponding period and the like are signaled per UE in subframe unit in a semi-static manner through a higher layer signal. Each UE delivers CSI considering a transmission mode to a base station according to a determined period through a UL control channel (PUCCH). If UL data simultaneously exists in a CSI transmitted subframe, CSI is transmitted through UL data channel (PUSCH) together with the data.

A base station transmits transmission timing information suitable for each UE to the corresponding UE by considering a channel status of each UE, a UE distribution status and the like. The transmission timing information includes a period, offset and the like for transmitting CSI and can be transmitted to each UE through an RRC message.

Cooperative Multipoint Transmission/Reception (CoMP) is described as follows.

A system since LTE-A intends to employ a method of increasing performance of a system by enabling cooperation among multiple cells. Such a method is called Cooperative Multipoint Transmission/Reception (CoMP). CoMP indicates a method that two or more base stations, access points or cells communicate with a UE cooperatively in order to perform communication between a specific UE and a base station, access point or cell more smoothly. In the present disclosure, a base station, an access or a cell may be used in the same sense.

Generally, in a multi-cell environment having a frequency reuse factor set to 1, performance and average sector throughput of a UE located on a cell-edge may be lowered due to Inter-Cell Interference (ICI). In order to reduce such ICI, a legacy LTE system employs a method of enabling a UE located on a cell-edge to have an appropriate throughput in an environment restricted by interference using a simple manual scheme such as Fractional Frequency Reuse (FFR) through a UE-specific power control. Yet, it may be more preferable to reduce ICI or reuse ICI as a signal desired by a UE rather than to lower a frequency resource use per cell. To achieve such an object, a CoMP transmission scheme is applicable.

A CoMP transmission scheme can be categorized into a CoMP-Joint Processing (CoMP-JP) scheme that is a cooperative MIMO type joint processing through data sharing and a CoMP-Coordinated Scheduling/Beamforming (CoMP-CS/CB) scheme.

In case of Downlink (DL), in a joint processing (CoMP-JP) process, a UE can simultaneously receive data from a plurality of base stations performing CoMP transmission scheme and is able to improve reception performance by combining signals respectively received from the base stations (Joint Transmission (JT)). Moreover, it is able to consider a method that one of base stations performing a CoMP transmission scheme transmits data to a UE at a specific timing (Dynamic Point Selection (DPS). In case of Coordinated Scheduling/Beamforming (CoMP-CS/CB) scheme, a UE can receive data instantaneously through a single base station, i.e., a serving base station.

In case that Joint Processing (CoMP-JP) scheme is applied in Uplink (UL), a plurality of base stations can simultaneously receive PUSCH signal from a UE (Joint Reception (JR)). On the contrary, in case of Coordinated Scheduling/Beamforming (CoMP-CS/CB) scheme, a single base station can receive PUSCH. Decision to use Coordinated Scheduling/Beamforming (CoMP-CS/CB) scheme can be made by coordinated cells (or base stations).

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 8:
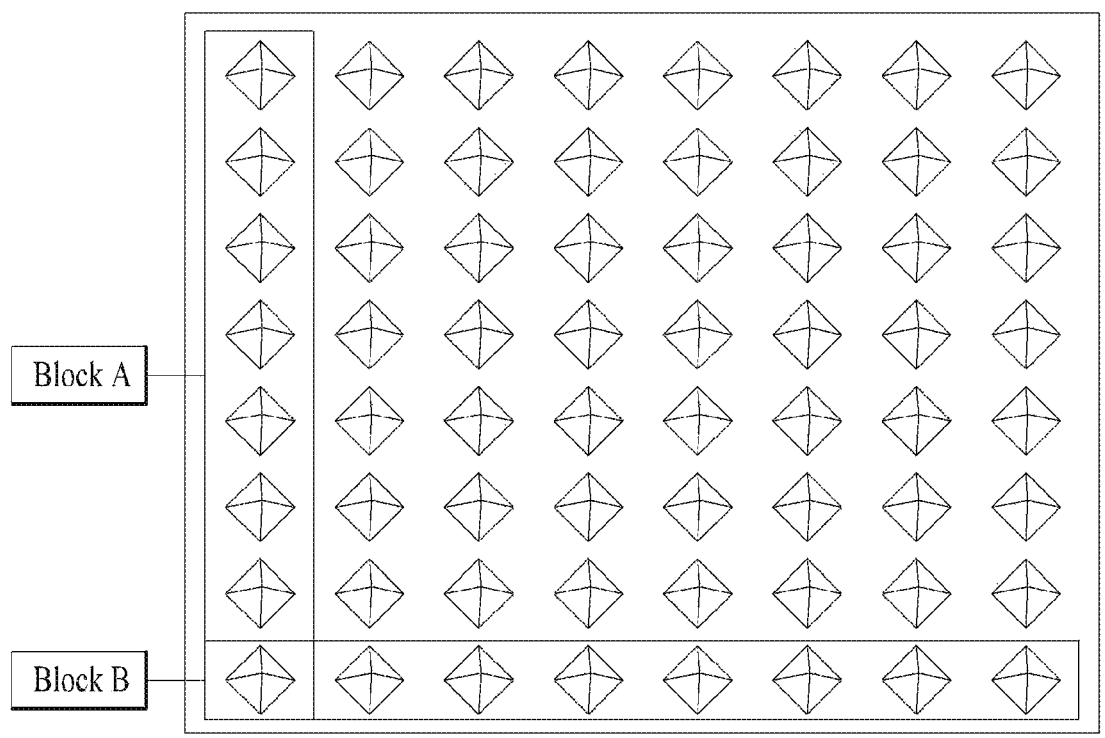
FIG. 8 shows an example of implementation of 2D-AAS.

FIG. 8 illustrates an example of implementation of the 2D-AAS. In particular, FIG. 8 presumes a co-polarized antenna array in which each antenna element has the same polarization. Referring to FIG. 8, the 2D-AAS is expected to be constructed as a system having a plurality of antennas by installing antennas in a vertical direction and a horizontal direction.

In a Millimeter Wave (mmW) system, since a wavelength is shortened, a plurality of antennas can be installed in the same area. That is, considering that the wavelength in the 30 GHz band is 1 cm, a total of 64 (8×8) antenna elements may be installed in a 4 by 4 cm panel at intervals of 0.5 lambda (wavelength) in the case of a 2-dimensional array. Therefore, in the mmW system, it is attempted to improve coverage or throughput by increasing beamforming (BF) gain using multiple antenna elements.

If each antenna element is equipped with a Transceiver Unit (TXRU) to enable adjustment of transmission power and phases per antenna element, independent BF may be performed for each frequency resource. However, installing TXRUs in all about 100 antenna elements is less feasible in terms of cost. Therefore, a method of mapping a plurality of antenna elements to one TXRU and adjusting the direction of a beam using an analog phase shifter has been considered. However, such an analog BF method is disadvantageous in that frequency selective BF is impossible because only one beam direction is generated over the full band.

As an intermediate form of digital BF and analog BF, hybrid BF with B TXRUs fewer than Q antenna elements may be considered. In the case of the hybrid BF, the number of beam directions that can be transmitted at the same time is limited to B or less although it depends on how the B TXRUs and the Q antenna elements are connected.

Figure 9:
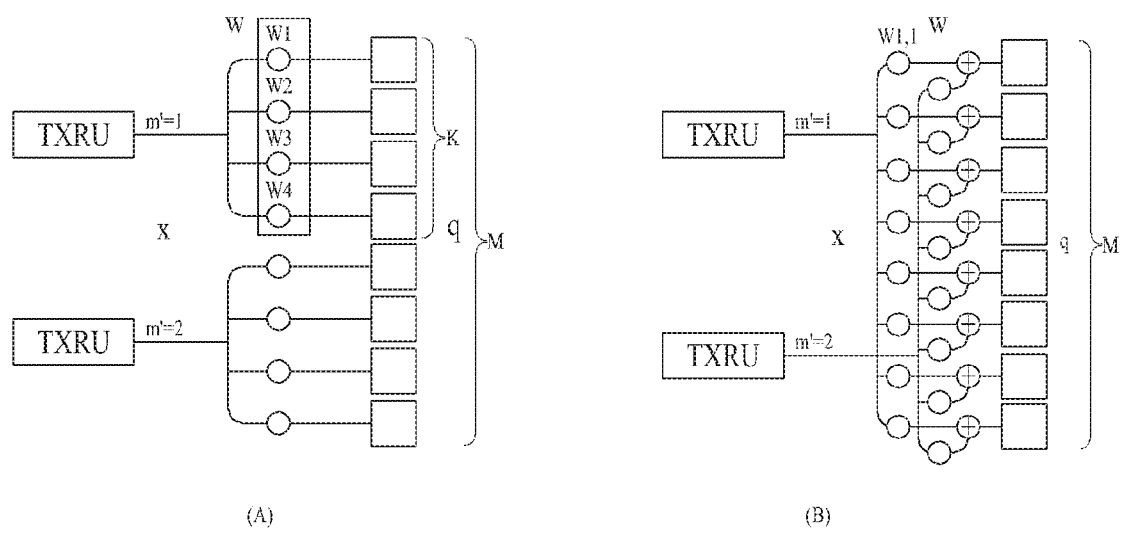
FIG. 9 shows methods of connecting TXRUs and antenna elements.

FIG. 9 illustrates methods of connecting TXRUs and antenna elements.

Specifically, FIG. 9(a) shows a method of connecting a TXRU to a sub-array. In this case, each antenna element is connected to one TXRU. In contrast to FIG. 9(a), FIG. 9(b) shows a method of connecting a TXRU to all antenna elements. In this case, each antenna element is connected to all TXRUs. In FIG. 9, W indicates a phase vector multiplied by means of an analog phase shifter. That is, the direction of analog BF is determined by W. In this case, CSI-RS antenna ports may be mapped one-to-one or one-to-many to TXRUs.

Figure 10:
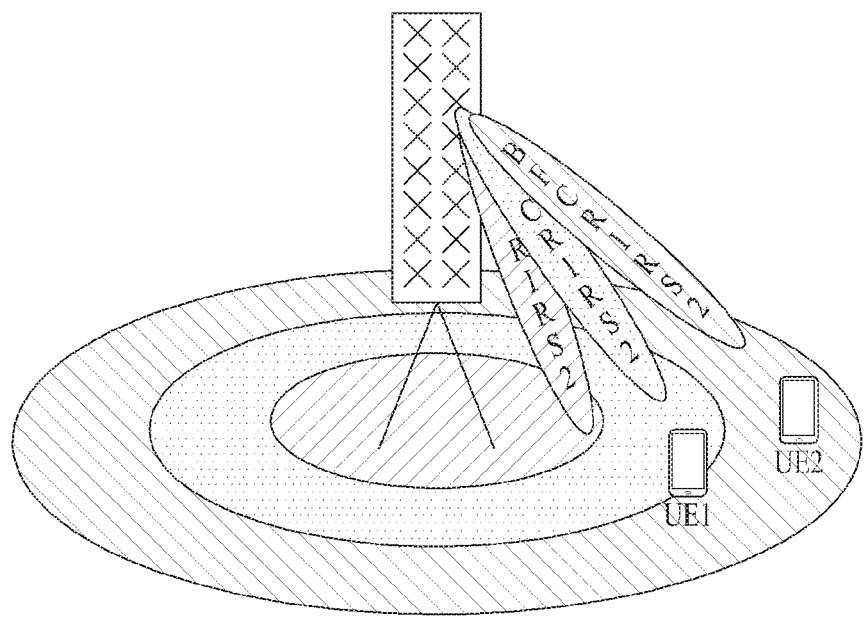
FIG. 10 shows an example in which a base station with 2D-AAS antennas performs beamforming in three vertical directions for DL communication.

FIG. 10 illustrates an example in which a base station with 2D-AAS antennas performs BF in three vertical directions for DL communication. For convenience of description, it is assumed that different vertical beams, i.e., vertical beams 0 to 2, are applied to Beamformed (BF) CSI-RS 0 to BF CSI-RS 2, respectively. However, this is merely an example. That is, different vertical and/or horizontal beams may be applied to BF CSI-RSs, and depending on the shapes of beams, the sector may pinpoint a specific area rather than having the vertical oval shape shown in the drawing. The proposed method may also be applicable to this case. Although an analog beam and/or a digital beam can be applied to a BF CSI-RS, it is assumed that an analog beam is applied to a BF CSI-RS and a digital beam to be applied after the analog beam is determined based on a PMI.

In FIG. 10, it is assumed that UE 1 is located near vertical sectors 1 and 2 corresponding to BF CSI-RSs 1 and 2, respectively and moves in the vicinity of vertical sectors 1 and 2 at high speed during several seconds. In addition, it is assumed that UE 2 is located in vertical sector 2 corresponding to BF CSI-RS 2 and moves within vertical sector 2 at high speed during several seconds. Thus, as a data (or control information) transfer method between the two UEs, closed-loop MIMO transmission is not suitable because it has severe performance degradation due to channel aging, but Open-Loop (OL) MIMO transmission with no PMI feedback or semi-OL MIMO transmission with partial PMI feedback is suitable therefor.

Meanwhile, assuming that the (semi-) OL MIMO transmission is applied, in the case of UE 2 data, the beam applied to BF CSI-RS 2 may be used because the reception strength of BF CSI-RS 2 is high. In addition, a digital precoder may be cycled on an RE/RB/PRG/SB basis, or a Space Frequency Block Code (SFBC) may be applied thereto to obtain diversity gain. On the other hand, in the case of UE 1 data, beams 1 and 2 may be cyclically transmitted on an RE/RB/PRG/SB basis because the reception strength of beam 1 applied to BF CSI-RS 1 is similar to that of beam 2 applied to BF CSI-RS 2. At the same time, a digital precoder may be cycled on an RE/RB/PRG/SB basis, or an SFBC may be applied thereto to obtain diversity gain.

Hereinafter, a CQI calculation method for a UE at the boundary of a sector like UE 1 when (semi-) OL MIMO is applied to the UE will be described.

First Embodiment—(Analog) Beam Cycling Scheme and CSI Calculation Method for UE

Figure 11:
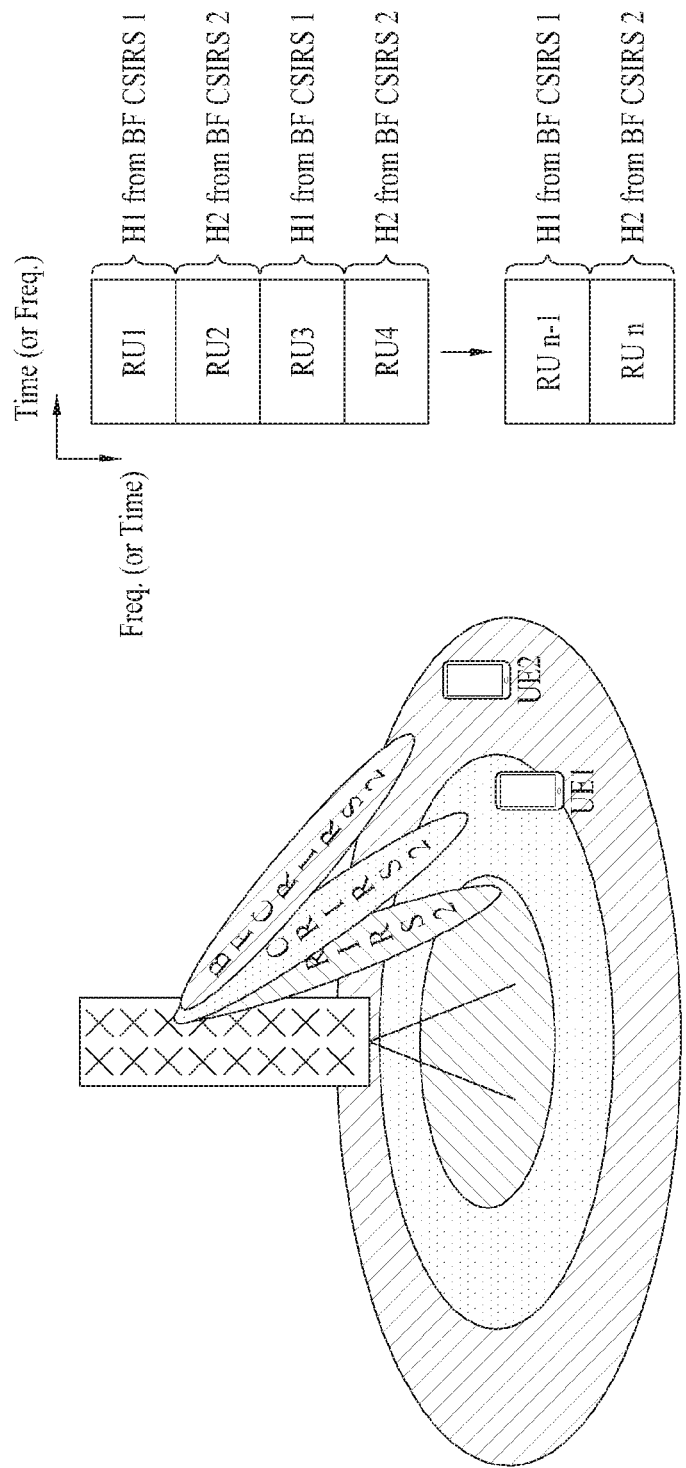
FIG. 11 shows a CQI calculation method for a UE based on cycling of multiple BF CSI-RSs according to an embodiment of the present disclosure.

FIG. 11 illustrates a CQI calculation method for a UE at the boundary of a sector when (semi-) OL MIMO is applied to the UE according to an embodiment of the present disclosure. In particular, FIG. 11 illustrates a CQI calculation method for a UE based on cycling of multiple BF CSI-RSs according to an embodiment of the present disclosure.

Referring to FIG. 11, UE 1 performs channel estimation by alternating between BF CSI-RS 1 and BF CSI-RS 2 on a frequency-time Resource Unit (RU) basis. If channels estimated from BF CSI-RS 1 and BF CSI-RS 2 are defined as H1 and H2, respectively, UE 1 calculates a WB/SB CQI by assuming channel H1 in odd-numbered RUs and channel H2 in even-numbered RUs. The RU may be defined as a frequency unit such as RE/RB/PRG/SB or as a time unit such as OFDM symbol/OFDM symbol group/time slot. However, considering frequency selectivity of a channel, the RU needs to be defined as a frequency unit.

The RU may be a logically defined resource unit. In this case, mapping thereof to physical resources is separately defined, and one RU may be composed of contiguous physical resources or non-contiguous (i.e., distributed) physical resources. Although cycling of two BF CSI-RSs is described for convenience of description, the proposed method may be equally applied by performing cycling on an RU basis when two or more BF CSI-RSs, i.e., multiple BF CSI-RSs are cycled. For example, when N BF CSI-RSs (e.g., BF CSI-RS 0, BF CSI-RS 1, BF CSI-RS 2, . . . , BF CSI-RS N-1) are cycled, a UE may perform channel estimation using a BF CSI-RS (r % N) for an RU index, r (where % denotes a modulo operation).

When SB CQI/CSI is calculated and reported, an (cycling) RU may be configured such that a multiple of the RU corresponds to a Subband (SB) unit. By doing so, multiple BF CSI-RSs are cycled in one SB, and thus beam diversity gain is reflected in the SB CQI/CSI. In addition, when the number of cycled BF CSI-RSs (i.e., (analog) transmission beams) is N, an SB is configured to be a multiple of (RU*N). For example, when the RU is one RB, the SB is configured to be (K*N RBs). As a result, sound beam cycling is performed K times in one SB. When WB CQI/CSI is calculated and reported, if a WB is configured to a multiple of (RU*N), sound beam cycling is performed K times in one WB.

Second Embodiment—Diversity Transmission Method Using (Analog) Beam Cycling and (Digital) Diversity Precoder In FIG. 11, a UE calculates OL CQI/CSI (i.e., CQI/CSI based on semi-OL or OL MIMO transmission) by cycling two BF CSI-RSs on an RU basis, and in this case, the UE calculates an attainable CQI (or CSI) by applying PMI cycling, SFBC precoding, and/or Large Delay (LD) Cyclic Delay Diversity (CDD) in order to obtain additional diversity gain for digital beams. The cycling RU of the BF CSI-RS may be set different from the cycling unit of a PMI. In addition, if the cycling RU of the BF CSI-RS is set to be large and the cycling unit of the PMI is set to be small, diversity gain may be effectively obtained within the beam (i.e., analog beam) of a single BF-CSI RS by cycling digital beams.

When data is received via CSI-RS ports, a UE calculates an attainable CQI according to Equation 11 below. Equation 11 shows mapping between the data and the CSI-RS port.

$$y_k(i)=A(i)B(i)x(i), \quad \text{[Equation 11]}$$

where i is modulation symbol index,
$y_k(i)$ is a vector representing the port(s) of BF CSIRS k,
A(i) and B(i) are a digital precoding matrix, respectively,
x(i) is a vector representing single-layer or multi-layer data (or control information When N BF CSI-RSs (e.g., BF CSI-RS 0, 1, 2, ..., N−1) are cycled, it is assumed that the UE receives the data using a BF CSI-RS, $y_{(r \% N)}(i)$ for an RU index, r. For convenience of description, a precoding matrix corresponding to a digital precoder is represented by matrix A and matrix B. When calculating CSI, the UE assumes that both matrix A and matrix B are applied to the CSI-RS ports and used for BF for data transfer. However, when performing demodulation, the UE assumes that only matrix B is applied to DM-RS ports and used for BF for data transfer. If matrix B is not a unit matrix, one-to-one mapping is no longer established between data and DM-RSs, and thus non-transparent DM-RS-based transmission is performed.

Meanwhile, since matrix A is applied to an effective channel estimated from each DM-RS port, it is UE-transparent. Details are described with reference to Equations 12 and 13.

$$z_k(i)=B(i)x(i), \quad \text{[Equation 12]}$$

where i is modulation symbol index,
$z_k(i)$ is a vector representing the DMRS port(s) on which (analog) beam k and precoding matrix A is applied,
B(i) is a digital precoding matrix,
x(i) is a vector representing single-layer or multi-layer data (or control information Equation 12 shows digital precoder B applied when data is transmitted via DM-RS ports. When (analog) beams 0, 1, 2, ..., N−1 are cycled, a UE receives the data using a DM-RS, $z_{(r \% N)}(i)$ for an RU index, r. The reason why matrix A is not applied in Equation 12 unlike Equation 11 is explained with reference to Equation 13.

$$y_k(i)=A(i)s(i), \quad \text{[Equation 13]}$$

where i is modulation symbol index,
$y_k(i)$ is a vector representing the port(s) of BF CSIRS k,
A(i) is a digital precoding matrix,
s(i) is a vector representing sequence(s)

According to Equation 13, DM-RS sequences are transmitted via CSI-RS ports after passing through digital precoder A. Thus, an effective channel where matrix A and (analog) beam k are applied is formed at a DM-RS port.

As a simple method, after setting matrix A to unit matrix I, digital precoding may be applied by means of matrix B. Consequently, the CSI-RS port and the DM-RS port are the same, and diversity gain may be obtained by setting a beam cycling matrix, an SFBC precoding matrix, or an LD CDD precoding matrix to matrix B. This is an OL MIMO transmission method similar to Transmission Mode (TM) 3, where a beam cycling matrix or a LD CDD precoding matrix is applied by means of a digital precoder, or TM 2, where an SFBC matrix is applied for digital precoding, of LTE REL-8 system using a CRS port for CSI calculation and demodulation. The proposed method is different from TM 2/3 in that additional beam diversity is obtained by BF CSI-RS cycling.

When matrix A is used, a DM-RS port with high channel strength in a specific direction may be generated for a UE, and additional diversity gain may be obtained using matrix B in the specific direction. For example, in the case of a dual codebook, a UE may generate matrix A by feeding W1 back and cycling part of a PMI for W2. That is, if the UE feeds back W1 PMI set to zero (i.e., W1 PMI=0), cycles W2 PMI within a range of {0, 1, 2, 3}, and sets the index of an RU, which is a cycling unit, to 1, the UE may obtain matrix A by setting A to W1(0)*W2(l mod 4) (i.e., A=W1(0)*W2(l mod 4)).

For matrix B, various configurations such as a WDU matrix corresponding to LD CDD (i.e., TM 3), an SFBC precoding matrix, or a co-phasing cycling matrix introduced in Rel-14 eFD-MIMO may be used. As an example of matrix B, the SFBC precoding matrix and the co-phasing cycling matrix are described with reference to Equations 14 and 15. In particular, Equation 14 shows that a transmission diversity scheme is used at rank 1, and Equation 15 shows that co-phasing cycling is used at rank 2. In Equations 14 and 15, i indicates a modulation symbol index, and RE-level PDSCH processing for semi-OL MIMO is performed based on DM-RS ports 7 and 8 (i.e., $z^{(7)}$ and $z^{(8)}$).

$$\begin{bmatrix} z^{(7)}(2i) \\ z^{(7)}(2i) \\ z^{(8)}(2i+1) \\ z^{(8)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \quad \text{[Equation 14]}$$

$$\begin{bmatrix} z^{(7)}(i) \\ z^{(8)}(i) \end{bmatrix} = \begin{bmatrix} 1 & 1 \\ \varphi_n & -\varphi_n \end{bmatrix} \begin{bmatrix} x^{(0)}(i) \\ x^{(1)}(i) \end{bmatrix}, \varphi_n = e^{j\pi \bmod(i,2)/2} \quad \text{[Equation 14]}$$

Third Embodiment—Method of Configuring Cycling Set for BF CSI-RS

A set of cycling BF CSI-RSs to be used for calculating OL CQI (or OL CSI including an RI, a PMI, and a CQI on the assumption of OL MIMO) may be configured as follows.

First, a base station indicates to a UE a set of BF CSI-RSs, and the UE calculates an OL CQI by performing cycling within the indicated set. Depending on whether indication is dynamic or semi-static, this method may be sub-divided as follows.

Semi-static Indication: a base station defines a plurality of BF CSI-RSs within a single CSI process (or a single CSI measurement set or BF CSI-RS group) and semi-statically indicates to a UE the plurality of BF CSI-RSs through RRC signaling. Then, the UE calculates an OL CQI by cycling all BF CSI-RSs defined within the single CSI process. For example, when 8 BF CSI-RSs are configured within the CSI process, the UE calculates OL CSI by cycling all of the 8 BF CSI-RSs on an RU basis (in this case, the base station informs the UE of an RU).

Dynamic Indication: a base station defines a plurality of BF CSI-RSs within a single CSI process (or a single CSI measurement set or BF CSI-RS group) and semi-statically indicates to a UE the plurality of BF CSI-RSs through RRC signaling. Thereafter, the base station additionally indicates a certain subset among the CSI-RSs defined within the corresponding CSI process through L1/L2 signaling (DCI/MAC signaling), and the UE calculates OL CSI by cycling CSI-RSs in the corresponding subset. By dynamically designating a BF CSI-RS cycling subset using the proposed method, the base station may rapidly change an optimized cycling (analog) beam based on the location of the UE. This method may be useful when the location of a UE is expected, for instance, when the UE is on a railroad or a highway. For example, the base station may configure 8 BF CSI-RS capable of covering a wide range of expected UE locations within a single CSI process. Thereafter, the base station may indicate two BF CSI-RS capable of covering expected locations in a short-term period among the 8 BF CSI-RSs through L1/L2 signaling. After a certain period of time, the base station may signal other two BF CSI-RSs among the 8 BF CSI-RSs through L1/L2 signaling to obtain diversity gain.

Second, a UE determines a set of cycling BF CSI-RSs and reports the determined set to a base station. In the second method, UE complexity increases since a BF CSI-RS set is determined by a UE, and UL overhead increases due to reporting of the determined set. The following method is used to overcome the disadvantages of the second method.

Third, a base station informs a UE of cycling BF CSI-RS subset candidates through L1/L2 or RRC signaling, and the UE selects one candidate from among the cycling BF CSI-RS subset candidates and then reports the selected candidate to the base station. For example, the base station defines 8 BF CSI-RSs (i.e., BF CSI-RS 0 to BF CSI-RS 7) within a single CSI process (or a single CSI measurement set or BF CSI-RS group) and indicates to the UE the 8 BF CSI-RSs through RRC signaling in a semi-static manner. Thereafter, the base station designates as selectable cycling BF CSI-RS subset candidates {BF CSI-RS 0}, {BF CSI-RS 1 to BF CSI-RS 3}, {BF CSI-RS 4 to BF CSI-RS 6}, {BF CSI-RS 1, BF CSI-RS 3, BF CSI-RS 5, and BF CSI-RS 7}. Then, the UE selects one of the four subset candidates to calculate OL CSI and then reports the selected candidate to the base station.

If {BF CSI-RS 0} is selected, the UE does not apply the BF CSI-RS cycling. However, even in this case, spatial diversity gain for digital BF may be obtained. If the beam applied to BF CSI-RS 0 is toward a specific local area, the UE may obtain the spatial diversity gain for the digital BF in the corresponding area. If the beam applied to BF CSI-RS 0 is toward a whole cell/sector area or a large area, the UE may obtain the spatial diversity gain for the digital BF in the whole cell/sector area. As described above, while selecting a cycling BF CSI-RS subset, the UE determines whether or not to apply the (analog) BF CSI-RS cycling and (implicitly) reports the result. Alternatively, the UE (explicitly) reports its ON/OFF preference for the BF CSI-RS cycling in a long-term period to the base station, and the base station designates or schedules cycling BF CSI-RS subset candidates based on the report. Alternatively, the UE autonomously determines ON/OFF of the BF CSI-RS cycling in a long-term period and then reports the results to the base station. When it is determined that the BF CSI-RS cycling is ON, the UE reports CSI to which the BF CSI-RS cycling is applied. On the contrary, when it is determined that the BF CSI-RS cycling is OFF, the UE reports CSI to which the BF CSI-RS cycling is not applied. Alternatively, the base station may determine ON/OFF of the BF CSI-RS cycling from the perspective of a network and inform the UE of the result.

In a similar way, the UE may autonomously determine ON/OFF of a diversity precoder for digital beams and the type of a diversity precoder to be used (i.e., SFBC precoder, LD CDD precoder, SD CDD precoder, beam cycling precoder, co-phase cycling precoder, etc.) and then reports the results to the base station. Considering UL overhead, such a report needs to be transmitted with a long-term periodicity. Alternatively, from the perspective of the network, the base station may determine these issues and then inform the UE of the results.

The UE should report to the base station its capability, i.e., up to how many candidates of cycling BF CSI-RS sets the UE handles for OL CSI calculation, and the base station should designate cycling BF CSI-RS set candidates based on the corresponding report. That is, when the UE has low processing capability, the UE reports the maximum number of candidates smaller than the original value to prevent the CSI calculation from being overloaded.

Another reason why the base station designates the cycling BF CSI-RS set candidates in the third method is that the number of analog beams that can be transmitted at an instance (or in one OFDM symbol) is limited. In other words, the base station needs to designate the candidates by considering the limitation. For example, it is assumed that the base station has 8 TXRUs and manages the system by mapping the TXRUs to CSI-RS ports one by one. If the UE is configured with 2-port BF CSI-RS i (where i=0, 1, 2, or 3) to which (analog) beam i is applied, the UE may receive data through up to 4 (analog) beams at an instant (i.e., in one OFDM symbol) from 2 antenna ports of the BS. Therefore, the base station may indicate a cycling set consisting of up to 4 BF CSI-RSs.

Meanwhile, if the UE is configured with 4-port BF CSI-RS i (where i=0, 1, 2, or 3) to which (analog) beam i is applied, the UE may receive data through up to 2 (analog) beams in one OFDM symbol from 4 antenna ports of the BS. Thus, the base station may indicate a cycling set consisting of up to 2 BF CSI-RSs. Further, if the UE is configured with 8-port BF CSI-RS i (where i=0, 1, 2, or 3) to which (analog) beam i is applied, the UE may receive data through up to 1 (analog) beam in one OFDM symbol from 8 antenna ports of the BS, Thus, the base station may indicate a cycling set consisting of a maximum of 1 BF CSI-RSs. In summary, the base station should inform the UE of a cycling beam set(s) or the candidate(s) of the cycling beam set(s) by considering the number of TXRUs and the number of CSI-RS ports.

Fourth Embodiment—Cycling BF CSI-RS Configuration Restriction and OL CSI

FIG. 12 illustrates OL CSI calculated and reported by a UE according to an embodiment of the present disclosure.

Referring to FIG. 12, a UE estimates channels to which different (analog) beams are applied using BF CSI-RS 1 and BF CSI-RS 2 as shown in FIG. 11 and calculates CSI by alternately assuming the channels for each RU. In this case, the calculated RI is the best RI that can be received when the two BF CSI-RS channels coexist, and the calculated RI is one common RI (that is, it is not two RIs separately applied to the BF CSI-RSs). If the two BF CSI-RS have different port numbers, each CSI-RS may have a different selectable RI set. Thus, in this case, the maximum RI may be determined with respect to the smaller CSI-RS port number. Alternatively, the UE expects that a base station configures the same selectable RI set for the two CSI-RSs through RRC signaling such as Codebook Subset Restriction (CSR).

In addition, the calculated CQI is the best CQI that can be received when the two BF CSI-RS channels coexist, and the calculated CQI is one common CQI (that is, it is not two CQIs separately applied to the BF CSI-RSs).

However, there are two possible methods for a PMI.

As a first method, the UE calculates the CSI by applying a different cycling PMI (i.e., digital precoder) to each BF CSI-RS. For example, assuming beam cycling of matrix A, the UE feeds back different values of W1 for the channel of BF CSI-RS 1 (channel H1) and the channel of BF CSI-RS 2 (channel H2) and creates matrix A by cycling W2. That is, in the case of H1, the UE generates matrix A using W1 PMI=1 and W2 PMI cycling of {0, 1, 2, 3}, and in the case of H2, the UE generates matrix A using W1 PMI=2 and W2 PMI cycling of {0, 1, 2, 3}. In this example, although W1 PMI corresponding to H1 is different from W1 PMI corresponding to H2, the set of cycling W2 PMI corresponding to H1 is equal to that of cycling W2 PMI corresponding to H2. Additionally, if the sets of cycling W2 PMI are differently configured, the best beam cycling may be applied to each channel. Since different (analog) beams are applied to H1 and H2, W1 PMI may have different best values. As a result, the UE feeds back two partial PMIs (for example, two values of W1) in semi-OL MIMO. However, in this case, the amount of UE PMI calculation and UL payload size may increase.

As a second method, the UE calculates the CSI by applying common PMI cycling to cycling BF CSI-RSs. That is, the UE generates matrix A using one common value of W1 PMI for H1 and H2 (for example, if the UE feeds back W1 PMI=1, the UE generates matrix A using W1 PMI=1) and W2 PMI cycling of {0, 1, 2, 3} and then calculates the CSI. Consequently, the UE feeds back one common value of W1 only.

Matrix B for determining digital precoding may also be configured differently or equally for each BF CSI-RS.

When cycling BF CSI-RSs have different port numbers, the implementation complexity of a UE and a base station may increase. Thus, port numbers may be configured to be the same at all times. That is, the UE does not expect that the cycling BF CSI-RSs have different port numbers (alternatively, when the UE configures a cycling BF CSI-RS set, the UE configures the cycling BF CSI-RS set using only BF CSI-RSs with the same port number). When the common PMI cycling (i.e., second method) is used, the same port number is particularly preferred. This is because since different codebooks are used when port numbers are different, it is difficult to apply a common PMI. Additionally, when PMI sets applicable to cycling are restricted due to CSR, etc., the same PMI set should be configured for all the cycling BF CSI-RSs.

Figure 13:
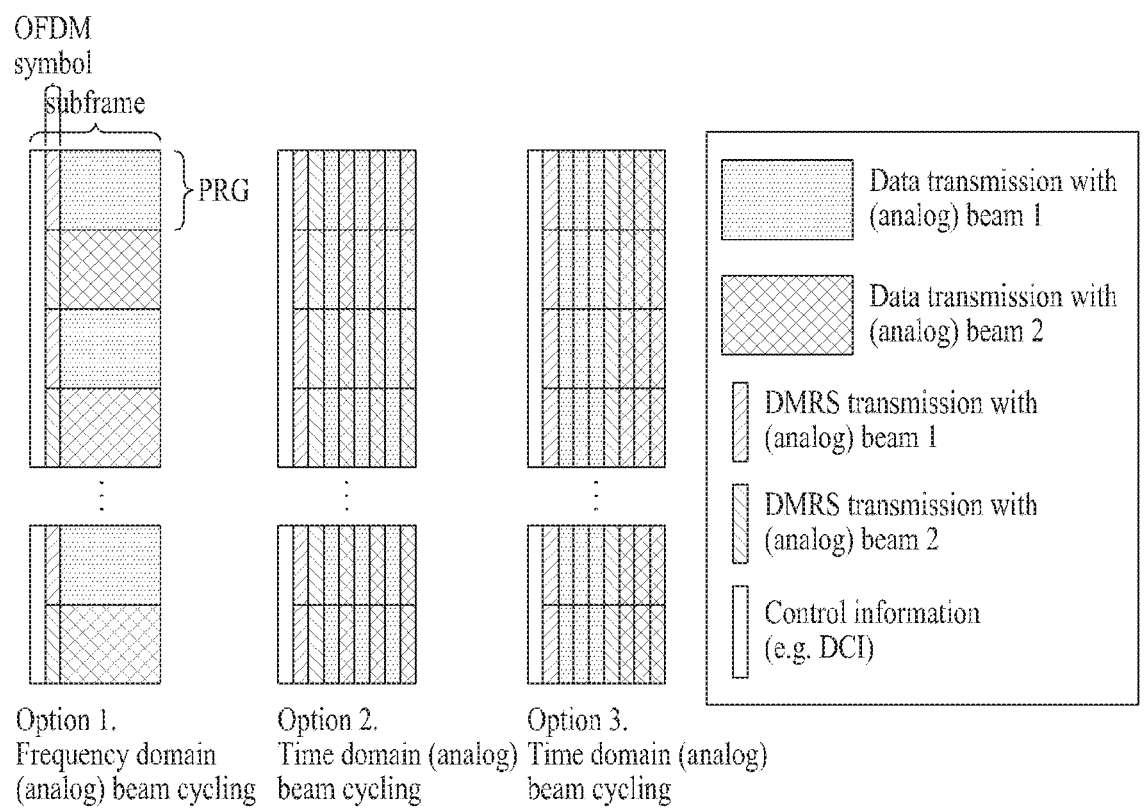
FIG. 13 shows three methods of operating (analog) beam cycling proposed in the present disclosure.

Fifth Embodiment—Transmission of Data/Control Information to which (Analog) Beam Cycling is Applied and Data/Control Information Demodulation Method for UE FIG. 13 illustrates three methods of operating (analog) beam cycling proposed in the present disclosure.

In option 1 of FIG. 13, the cycling frequency-time RU of a (analog) beam is a PRG corresponding to a frequency resource unit to which DM-RS PRB bundling is applied. A UE performs DM-RS channel estimation on a PRG basis and demodulates data in a PRG using a corresponding channel. According to option 1, two analog beams (i.e., beams 1 and 2) are simultaneously transmitted in one OFDM symbol. That is, more TXRUs are required to simultaneously transmit multiple analog beams (i.e., beams 1 and 2) in one OFDM symbol, and as a result, option 1 is disadvantageous in that the implementation cost of a base station increases.

In option 2, an OFDM symbol is set as the RU for analog beam cycling to overcome the disadvantage of option 1. Thus, one analog beam is transmitted in one symbol. However, option 2 is disadvantageous in that DM-RS overhead increase. In option 2, DM-RSs to which (analog) beams 1 and 2 are applied are transmitted using two OFDM symbols in one PRG compared to option 1.

If a large amount of time is required to change an analog beam in terms of hardware, it is not desirable to change the analog beam on a symbol basis as in option 2. In this case, it is preferable to cycle the analog beam on a symbol group basis as in option 3 in order to minimize performance degradation caused by the time required to change the analog beam.

In options 2 and 3, the CP length of an OFDM symbol where the beam is changed may be increased to mitigate the performance degradation caused by the time required to change the analog beam. When a beam is changed on a symbol basis as in option 2, an extended CP is applied to all symbols. On the other hand, when a beam is changed on a symbol group basis as in option 3, an extended CP is applied only to the first OFDM symbol of a symbol group where the beam is changed. In options 1 to 3, if the (analog) beam applied to control information is different from the beam applied to data and a DM-RS, an extended CP may be applied to a symbol next to the OFDM symbol in which the control information is transmitted.

The base station selects one of the options to be used and then inform the UE of the selected operation method, and the UE calculates OL CSI by cycling BF CSI-RSs on an RU basis according to the indicated operation method. In addition, when performing demodulation, the UE should change DM-RSs on an RU basis in the same manner. For example, in option 1, the UE should perform the DM-RS channel estimation per PRG and demodulates data in a PRG using a corresponding channel (in option 1, the UE calculates the CSI by cycling BF CSI-RSs on a PRG basis).

In option 2, the UE performs the DM-RS channel estimation in each of OFDM symbols 1 and 2. In addition, the UE should demodulate data transmitted in an odd-indexed OFDM symbol using a DM-RS channel of OFDM symbol 1 and demodulate data transmitted in an even-indexed OFDM symbol using a DM-RS channel of OFDM symbol 2 (in option 2, the UE calculates the CSI by cycling BF CSI-RSs on a symbol basis). In option 3, the UE demodulates data in a symbol group (e.g., slot) using the DM-RS channel of the first symbol of the corresponding group (in option 3, the UE calculates the CSI by cycling BF CSI-RSs on a symbol group or slot basis).

Although FIG. 13 shows the (analog) beam cycling only, digital beam diversity (e.g., beam cycling or SFBC) may be applied by matrix B of Equation 12 corresponding to data to DMRS port mapping, or digital beam cycling may be applied by matrix A of Equation 13 corresponding to DMRS sequence to CSI-RS port mapping. As described above, if diversity is obtained using matrix B, one-to-one mapping is no longer established between data and DM-RSs. On the other hand, if digital beam diversity is obtained using only matrix A without matrix B (that is, in the case of matrix B=unit matrix), one-to-one mapping is still applied between data and DM-RSs as in the conventional DM-RS transmission.

In addition, although FIG. 13 shows that a diversity transmission method is applied to data, the diversity transmission method may also be applied to control information (e.g., DCI). In other words, in options 1 to 3 of FIG. 13, control information may be transmitted by applying the (analog) beam cycling thereto on a specific RU basis. Details will be described together with whether a DM-RS or a separate RS is used as an RS for demodulation of control information.

First, if a separate RS (i.e., PDCCH RS) is configured to demodulate control information (which is different from a DM-RS), both the control information and the PDCCH RS should be transmitted by applying the (analog) beam cycling thereto on a specific frequency-time RU basis. For example, in options 1 to 3 of FIG. 13, if the control information and PDCCH RS are transmitted in a single PRG, the control information and PDCCH RS are transmitted through the same (analog) beam, and the applied beam is cycled on a PRG basis. To receive the control information and PDCCH RS, the UE performs channel estimation in each PRG using the PDCCH RS and then demodulates the control information.

Meanwhile, when the control information and PDCCH RS are transmitted in multiple symbols, the beam cycling may be applied on a symbol basis. For example, in options 1 to 3 of FIG. 13, if the control information and PDCCH RS are transmitted in 2 symbols, the control information and PDCCH RS to which beam 1 is applied are transmitted in the first symbol, and the control information and PDCCH RS to which beam 2 is applied are transmitted in the second symbol. The UE performs channel estimation in each symbol using the PDCCH RS and then demodulates the control information.

Second, a case in which a DM-RS (which is used for data demodulation) is used as an RS for demodulating control information will be described. For example, in options 1 to 3 of FIG. 13, the control information may be transmitted by applying the beam cycling thereto on a PRG basis. Specifically, in option 1, since the beam cycling is also applied to DM-RSs on a PRG basis, the UE estimates a DM-RS channel in each PRG and then demodulates the control information.

Meanwhile, in options 2 and 3, since the beam cycling is applied to DM-RSs on a symbol or symbol-group basis, the UE needs to perform channel estimation using DM-RSs existing in different symbols depending on PRGs carrying the control information. For example, in option 2, when demodulating the control information in an even-indexed PRG, the UE should use a DM-RS channel transmitted in the first OFDM symbol. On the contrary, when demodulating the control information in an odd-indexed PRG, the UE should use a DM-RS channel transmitted in the second OFDM symbol.

Further, when the control information is transmitted in multiple symbols, the beam cycling may be applied on a symbol basis. For example, in options 1 to 3 of FIG. 13, if the control information is transmitted in 2 symbols, the control information to which beam 1 is applied is transmitted in the first symbol, and the control information to which beam 2 is applied is transmitted in the first symbol. Specifically, in option 1, the UE receives the control information transmitted in the first symbol on a DM-RS channel in an even-indexed PRG and receives the control information transmitted in the second symbol on a DM-RS channel in an odd-indexed PRG. In options 2 and 3, the UE receives the control information transmitted in the first symbol on a DM-RS channel in the symbol to which beam 1 is applied and receives the control information transmitted in the second symbol on a DM-RS channel in the symbol to which beam 2 is applied.

Alternatively, if the conception of an EPDCCH is introduced to options 1 to 3, diversity gain may be obtained by transmitting control information in a similar way that data is transmitted. That is, the control information is transmitted in a data transmission RE, and a DM-RS is used to demodulate the control information as in data demodulation. However, in option 1, the control information should be received by bundling multiple PRGs in order to obtain the diversity gain. On the other hand, in options 2 and 3, since beams are cycled on a symbol (or symbol group) basis, the diversity gain may be obtained from a single PRG.

Six Embodiment—(Analog) Beam Cycling and Antenna Port Aggregation Method

Figure 14:
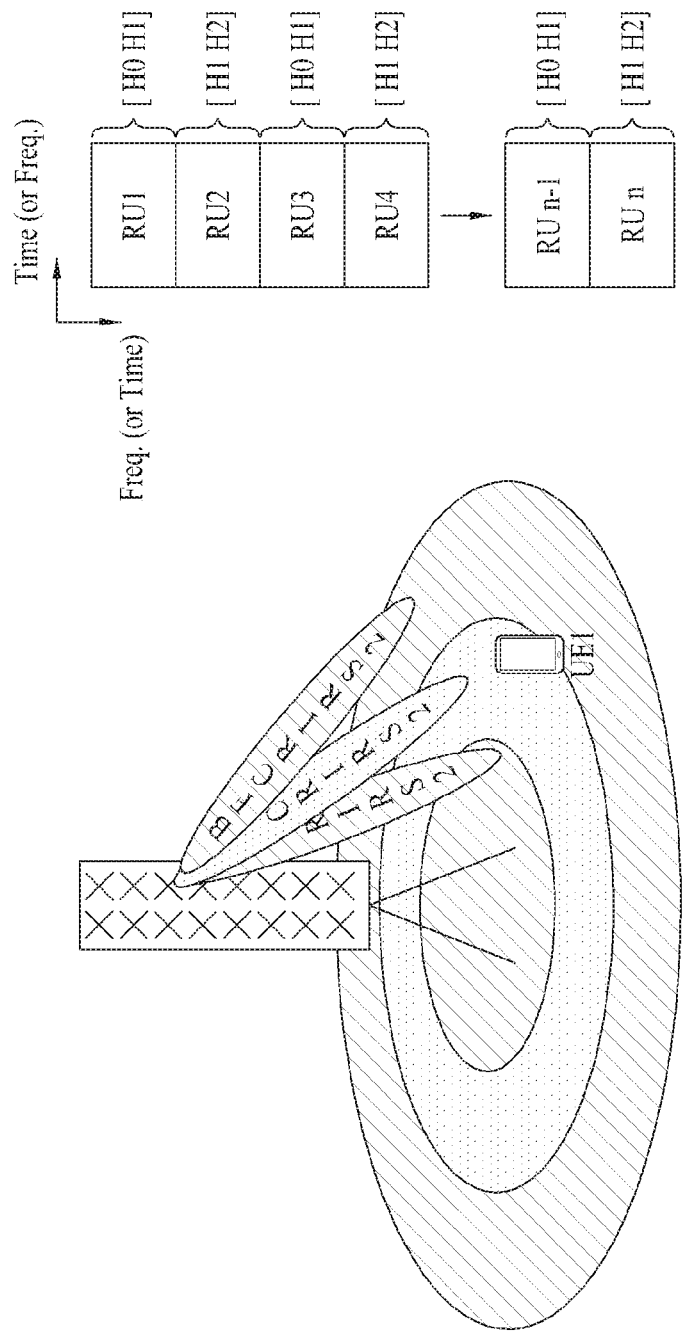
FIG. 14 shows a CQI calculation method for a UE based on cycling of multiple BF CSI-RSs and port aggregation according to an embodiment of the present disclosure.

FIG. 14 illustrates a CQI calculation method for a UE based on cycling of multiple BF CSI-RSs and antenna port aggregation according to an embodiment of the present disclosure. Herein, the antenna port aggregation means that when a UE intends to report CSI to receive downlink data from two or more transmission points based on Joint Transmission (JT), the UE provides feedback by regarding antenna ports of the two or more transmission points as one antenna port set in order to reduce feedback overhead.

Referring to FIG. 14, when a UE intends to estimate a channel for each RU, the UE performs channel estimation using two or more BF CSI-RSs unlike FIG. 11. Then, the UE creates one super channel by aggregating multiple channels and then calculates CSI based on the super channel. In FIG. 14, H0, H1, and H2 denotes channels estimated from BF CSI-RSs 0, 1, and 2, respectively.

For example, in RU 1, the UE estimates a 1-port channel H0 and a 1-port channel H1 from 1-port BF CSI-RS 0 and 1-port BF CSI-RS 1, respectively, creates a 2-port channel [H0 H1] by aggregating the two channels, and then calculates CSI based on the 2-port channel [H0 H1]. In RU 2, the UE calculates CSI in the same way but using a different BF CSI-RS combination. That is, (analog) beam diversity may be obtained by cycling a BF CSI-RS combination for each RU. To decrease implementation complexity, the following restrictions may be applied: multiple CSI-RSs to be aggregated in one RU should have the same port number, and the sum of the ports numbers of the aggregated multiple CSI-RSs should be equal in each RU.

However, in Equation 11, a CSI-RS port denoted by y should be changed to an aggregated port. That is, assuming that the port of BF CSI-RS i is $y_i$, y is set to $y=[y_0^T \ y_1^T]^T$ in an even-numbered RU and set to $y=[y_1^T \ y_2^T]^T$ in an odd-numbered RU. In addition, digital beam diversity may be obtained using matrixes A and B of Equation 11.

A base station may inform the UE whether the UE should perform the BF CSI-RS cycling and the port aggregation. In addition, the base station may inform the UE of cycling BF CSI-RS sets, combinations of aggregated BF CSI-RSs, and/or the number of BF CSI-RSs to be aggregated, and the UE may calculate CSI by applying the cycling according to the indication. Alternatively, the UE may select the cycling BF CSI-RS sets, the combinations of aggregated BF CSI-RSs, and/or the number of BF CSI-RSs and then report them to the BS.

Although the above example shows that the port aggregation is applied to two CSI-RSs for convenience of description, the present disclosure may be applied when the port aggregation is applied to N CSI-RSs. In addition, although the example shows that CSI-RS 0 and CSI-RS 1 corresponding to a pair of adjacent analog beams are aggregated and CSI-RS 1 and CSI-RS 2 corresponding to another pair of adjacent analog beams are aggregated, CSI-RS 0 and CSI-RS 2 corresponding to a pair of distant analog beams may be aggregated, and this beam pair may be added to the cycling.

Seventh Embodiment—Application of (Analog) Reception Beam Cycling

If a UE's (analog) Reception (Rx) beam is capable of being configured in a specific direction rather than in omnidirection, (analog) Rx beam diversity may also be obtained by additionally applying Rx beam cycling in addition to (analog) Transmission (Tx) beam diversity obtained from BF CSI-RS cycling.

As a simple method, a cycling Rx beam group may be configured regardless of a cycling Tx beam group. In this case, if Rx and Tx beams have the same cycling RU, a specific Rx and Tx beam combination may be repeated. For example, assuming that the cycling Rx beam group is {1, 2, 3}, the cycling Tx beam group is {4, 5, 6}, and the Rx and Tx beam groups have the same RU, (Rx beam, Tx beam) may be cycled as follows: (1, 4), (2, 5), and (3, 6). However, in this case, a pair of two beams (e.g., (1, 4)) may be a worst pair, and if the worst pair is repeated, it may cause performance degradation. To prevent the worst pair, Rx and Tx beam cycling should have different RUs, and more particularly, one RU should be set to a multiple of the other RU.

For example, the RU of the Tx beam cycling may be set to a group of OFDM symbols and the RU of the Rx beam cycling may be set to an OFDM symbol so that various RX beams may be cycled for each Tx beam. A base station may indicate to the UE the RU of the Tx beam cycling and the RU of Rx beam cycling. If the number of cycling Rx beams is N, the RU of the Tx beam cycling may be set to a multiple of (the RU of the Rx beam cycling*N). For example, assuming that the RU of the Rx beam cycling is a symbol and the number of cycling Rx beams is 2, the RU of the Tx beam cycling is set to a multiple of 2 symbols (for example, when the multiple is K=4, the RU of the Tx beam cycling is set to 2*4=8) so that the RX beam cycling is performed K times for one TX beam. Although it is described that the RU of the Tx beam cycling is a multiple of the RU of the Rx beam cycling, the present disclosure can be applied when the RU of the Rx beam cycling is a multiple of the RU of the Tx beam cycling. The Rx beam cycling is applied to both when CSI is calculated and when data is received.

Since the channel intensity of a (analog) Rx beam depends on the direction of a (analog) Tx beam, the Tx beam cycling and the Rx beam cycling needs to be designed jointly rather than independently by considering the relationship therebetween.

Specifically, the Tx beam cycling and the Rx beam cycling are configured to have the same RU, and the base station indicates to the UE Rx beams corresponding to Tx beams. Since the Tx beam cycling is applied to the UE through the BF CSI-RS cycling, the base station indicates an RX beam that the UE should use for each BF CSI-RS. For example, if Tx beams 1 to 3 are cycled, the base station indicates Rx beam indices of {4, 5, 6} to be used for the individual Tx beams, and the UE uses Rx beams 4, 5, and 6 when performing channel estimation for BF CSI-RS 1, 2, and 3 (which respectively correspond to Tx beams 1, 2, and 3), respectively.

Since the above Rx beam indication method may cause additional control channel overhead, the base station and UE may determine Tx beams to be cycled according to a predetermined rule. In this case, since the UE already knows the Tx beams to be cycled according to the predetermined rule, the UE may adjust an RX beam to the best Rx beam. For example, if the base station cycles K BF CSI-RSs, the base station and UE may determine that a Tx beam applied to a k-th cycling BF CSI-RS is the k-th best Tx beam pre-reported by the UE. In this case, since the UE already knows the best Rx beam for the k-th best Tx beam, the UE calculates CSI by changing the best Rx beam for each RU. In this case, it is obviously assumed that the base station and UE shares information on the RU. The UE receives data by changing the best Rx beam for each RU.

Figure 15:
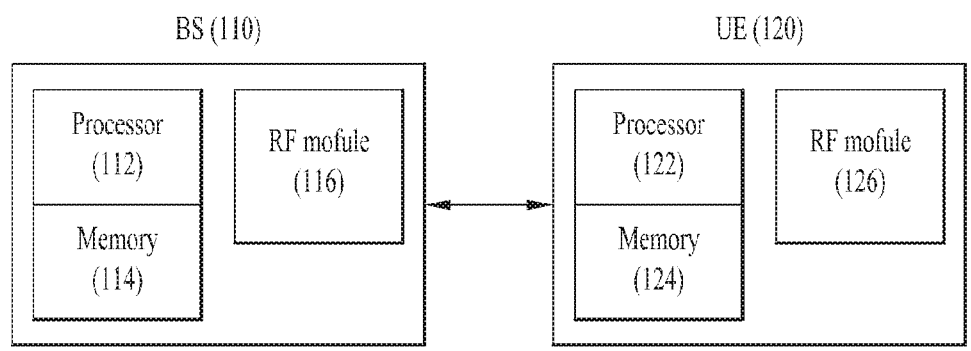
FIG. 15 shows a base station and user equipment applicable to an embodiment of the present disclosure.

FIG. 15 shows a base station and user equipment applicable to an embodiment of the present disclosure.

Referring to FIG. 15, a wireless communication system includes a Base Station (BS) 110 and a User Equipment (UE) 120. The BS 110 includes a processor 112, a memory 114 and a Radio Frequency (RF) unit 116. The processor 112 may be configured to implement procedures and/or methods proposed by the present disclosure. The memory 114 is connected to the processor 112 and stores various information related to operations of the processor 112. The RF unit 116 is connected to the processor 112 and transmits and/or receives a wireless signal. The UE 120 includes a processor 122, a memory 124 and an RF unit 126. The processor 122 may be configured to implement procedures and/or methods proposed by the present disclosure. The memory 124 is connected to the processor 122 and stores various information related to operations of the processor 122. The RF unit 126 is connected to the processor 122 and transmits and/or receives a wireless signal. The BS 110 and/or UE 120 may have a single antenna or multiple antennas.

The above-described embodiments are proposed by combining constituent components and characteristics of the present disclosure according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present disclosure. The order of operations disclosed in the embodiments of the present disclosure may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, a base station may be substituted with such a terminology as a fixed station, a Node B, an eNode B (eNB), an access point (AP) or the like.

The embodiments of the present disclosure can be implemented by a variety of means, for example, hardware, firmware, software, or a combination thereof. In the case of implementing the present disclosure by hardware, the present disclosure can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present disclosure are implemented by firmware or software, the present disclosure can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

The memory unit is provided within or outside the processor to exchange data with the processor through the various means known to the public.

It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

INDUSTRIAL APPLICABILITY

Although the method for transmitting a plurality of BF RSs for OL MIMO transmission in a wireless communication system and apparatus therefor are described based on the 3GPP LTE system, the method and apparatus can be applied to various wireless communication systems as well as the 3GPP LTE system.

What is claimed is:

1. A method of reporting channel state information to a base station by a User Equipment (UE) in a wireless communication system, the method comprising:
   receiving, from the base station, N reference signals including a first reference signal and a second reference signal, N being equal to or greater than 2, the N reference signals either (a) being beamformed in horizontal transmission directions and not in vertical transmission directions or (b) being beamformed in vertical transmission directions and not in horizontal transmission directions, the N reference signals being cyclically beamformed in different horizontal transmission directions or in different vertical transmission directions, and the N reference signals being cycled on a first resource unit (RU) basis based on that a reference signal having an index of R is mapped to an RU having an index of r, wherein R=(r modulo N); and
   reporting a single set of channel state information to the base station at least based on both the first reference signal and the second reference signal,
   wherein the single set of channel state information includes both a first precoder set related to the first reference signal and a second precoder set related to the second reference signal,
   wherein the single set of channel state information includes a common rank indicator and a common channel quality indicator calculated on an assumption that both the first precoder set and the second precoder set are applied, and
   wherein reception directions of the N reference signals are cycled on a second RU basis, and one of the first RU or the second RU is a multiple of the other.

2. The method of claim 1, wherein each of the first and the second precoder sets includes one first precoder for supporting a dual codebook, and wherein a first precoder related to the first reference signal is different from a first precoder related to the second reference signal.

3. The method of claim 1, wherein the common rank indicator and the common channel quality indicator are calculated on an assumption that:
   in a resource unit in which the first reference signal is received, a first precoder related to the first reference signal and a plurality of second precoders related to the first reference signal and cycled in the resource unit are combined and applied; and
   in a resource unit in which the second reference signal is received, a first precoder related to the second reference signal and a plurality of second precoders related to the second reference signal and cycled in the resource unit are combined and applied.

4. The method of claim 1, wherein a number of antenna ports for the first reference signal is equal to a number of antenna ports for the second reference signal.

5. A User Equipment (UE) in a wireless communication system, the UE comprising:
   a wireless transceiver; and
   a processor connected to the wireless transceiver,
   wherein the processor is configured to:
   receive, from a base station, N reference signals including a first reference signal and a second reference signal, N being equal to or greater than 2, the N reference signals either (a) being beamformed in horizontal transmission directions and not in vertical transmission directions or (b) being beamformed in vertical transmission directions and not in horizontal transmission directions, the N reference signals being cyclically beamformed in different horizontal transmission directions or in different vertical transmission directions, and the N reference signals being cycled on a first resource unit (RU) basis based on that a reference signal having an index of R is mapped to an RU having an index of r, wherein R=(r modulo N); and
   report a single set of channel state information to the base station at least based on both the first reference signal and the second reference signal, and
   wherein the single set of channel state information includes both a first precoder set related to the first reference signal and a second precoder set related to the second reference signal,
   wherein the single set of channel state information includes a common rank indicator and a common channel quality indicator calculated on an assumption that both the first precoder set and the second precoder set are applied, and
   wherein reception directions of the N reference signals are cycled on a second RU basis, and one of the first RU or the second RU is a multiple of the other.

6. The UE of claim 5, wherein each of the first and second precoder sets includes one first precoder for supporting a dual codebook, and wherein a first precoder related to the first reference signal is different from a first precoder related to the second reference signal.

7. The UE of claim 5, wherein the common rank indicator and the common channel quality indicator are calculated on an assumption that:
   in a resource unit in which the first reference signal is received, a first precoder related to the first reference signal and a plurality of second precoders related to the first reference signal and cycled in the resource unit are combined and applied; and
   in a resource unit in which the second reference signal is received, a first precoder related to the second reference signal and a plurality of second precoders related to the second reference signal and cycled in the resource unit are combined and applied.

8. The UE of claim 5, wherein a number of antenna ports for the first reference signal is equal to a number of antenna ports for the second reference signal.

* * * * *